United States Patent [19]

Gabriel et al.

[11] 4,334,173

[45] Jun. 8, 1982

[54] HORIZONTAL WIDTH CONTROL CIRCUIT FOR IMAGE DISPLAY APPARATUS

[75] Inventors: Melvin E. Gabriel, Schaumburg; Joseph M. Van Baalen, Vernon Hills, both of Ill.

[73] Assignee: Zenith Radio Corporation, Glenview, Ill.

[21] Appl. No.: 189,252

[22] Filed: Sep. 22, 1980

[51] Int. Cl.³ .............................................. H01J 29/70
[52] U.S. Cl. .................................... 315/399; 315/370; 315/379; 315/397
[58] Field of Search ............... 315/379, 397, 399, 370; 335/212 (U.S. only)

[56] References Cited

U.S. PATENT DOCUMENTS

| 2,900,565 | 8/1959 | Moore | 315/370 X |
| 3,769,542 | 10/1973 | Pieters | 315/399 |
| 3,914,650 | 10/1975 | Verbeij | 315/379 X |

FOREIGN PATENT DOCUMENTS 2305414  8/1973  Fed. Rep. of Germany ...... 315/399

Primary Examiner—Malcolm F. Hubler
Attorney, Agent, or Firm—Jack Kail

[57] ABSTRACT

A horizontal width control circuit for use with an image display apparatus includes first and second variable inductors connected in series and shunt relationship respectively with a horizontal deflection coil. The inductance of the inductors are variable in opposite directions for controlling the extent of horizontal deflection through a relatively large range of values without detuning the horizontal deflection circuits.

3 Claims, 5 Drawing Figures

HORIZONTAL WIDTH CONTROL CIRCUIT FOR IMAGE DISPLAY APPARATUS

BACKGROUND OF THE INVENTION

The present invention relates to circuits for controlling the horizontal width of the raster of a CRT image display apparatus.

CRT image display apparatus such as those used in video monitors and television receivers typically include a set of deflection coils mounted on the neck of the tube which are energized to produce electromagnetic fields for horizontally and vertically deflecting the electron beam produced by the CRT electron gun across the CRT screen. In order to produce the desired scanning pattern, a current signal having a waveform comprising a repetitive sequence of sawtooth pulses is induced in the deflection coils, the amplitude and width of the sawtooth pulses determining the extent of deflection of the electron beam across the CRT screen. The sawtooth current pulses are normally induced in the deflection coils in response to signals developed at the output of a sweep amplifier which, in turn, is operated in response to a horizontal or vertical oscillator whose oscillatory frequency is synchronized to the processed video signal.

In such display apparatus, it frequently becomes necessary to provide a facility whereby the extent of deflection, particularly in the horizontal direction, can be manually set or adjusted. Prior art attempts to provide such an adjustment capability have generally taken one of two forms. In one technique, a variable, relatively low impedance inductor is connected in series with the horizontal deflection coil increasing the total impedance seen at the output of the horizontal sweep amplifier. Through a voltage divider action, the voltage developed across the horizontal deflection coil, together with the current flowing therethrough, is reduced thereby decreasing the amplitude of the sawtooth current pulses and the extent of horizontal deflection. Increasing the inductance of the variable inductor further decreases the amplitude of the sawtooth current pulses and the extent of horizontal deflection while decreasing the inductance increases the amplitude of the sawtooth current pulses increasing the extent of horizontal deflection.

In another prior art technique, a variable, relatively high impedance inductor is connected in shunt with the horizontal deflection coil dividing the sawtooth current pulses between the deflection coil and the shunting coil thereby reducing the sawtooth current in the deflection coil and the extent of horizontal deflection. Decreasing the inductance of the variable inductor further decreases the sawtooth current signal and the extent of horizontal deflection while increasing the inductance increases the sawtooth current signal increasing the extent of horizontal deflection.

In both cases, i.e. the prior art series width control and the prior art shunt width control, it will be appreciated that the variable control inductor loads the horizontal sweep amplifier and that the loading effect changes for different settings of the control inductor. In particular, in the prior art series width control circuits, the impedance seen at the output of the horizontal sweep amplifier is directly related to the setting of the variable control inductor while, in the prior art shunt width control circuits, the impedance is inversely related to the setting of the variable control inductor. Since the horizontal deflection circuits are designed for optimum operation when connected to an output impedance having a certain constant level, the effect of varying the inductance of the variable control inductor for adjusting the extent of horizontal deflection is to detune the horizontal deflection circuits and thereby degrade their operation. In addition, it has been found that the range of horizontal width control which may be realized using either prior art circuit is generally insufficient for many applications.

It is accordingly a primary object of the present invention to provide an improved circuit for controlling the extent of horizontal deflection in an image display apparatus. It is a more specific object of the invention to provide an improved circuit of the foregoing type whose operation does not significantly detune the horizontal deflection circuit of the image display apparatus and which provides an increased range of horizontal width control.

BRIEF DESCRIPTION OF THE DRAWINGS

The present invention can be more fully understood from the following description when taken in connection with the accompanying drawings, in which.

DESCRIPTION OF THE PREFERRED EMBODIMENT

Figure 1:
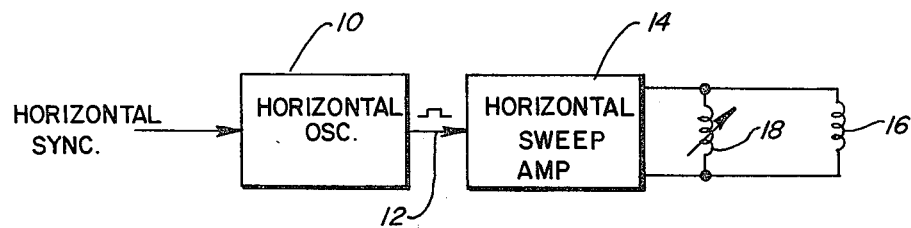
FIG. 1 illustrates one form of a prior art horizontal width control circuit used in an image display apparatus incorporating a CRT.
Figure 2:
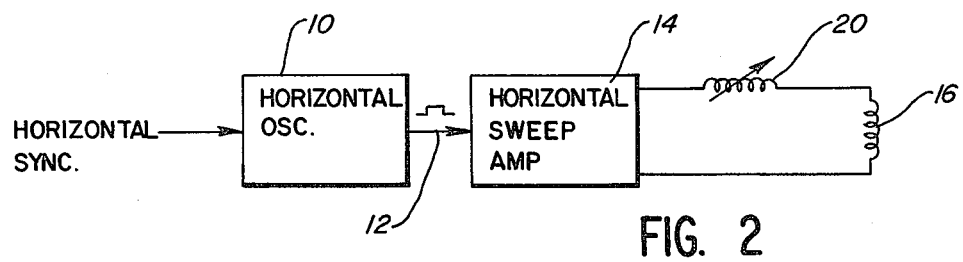
FIG. 2 shows another form of a prior art horizontal width control circuit.

Referring now to the drawings and, in particular, to FIGS. 1 and 2, there is shown two forms of prior art horizontal width control circuits used to control the extent of horizontal deflection of an electron beam across the face of a CRT screen. In both circuits, a horizontal oscillator 10 develops a square wave output signal on a conductor 12 in response to a horizontal sync signal, the frequency of the square wave signal developed on conductor 12 being thereby synchronized to the horizontal sweep rate of the video signal being processed by the image display apparatus including the CRT. In this regard, it will be appreciated that the term "image display apparatus" as used herein comprehends any form of video display apparatus using a CRT including, for example, video monitors and television receivers. The output square wave signal developed on conductor 12 is amplified by a horizontal sweep amplifier 14 and then coupled to a horizontal deflection coil 16 mounted on the neck of the CRT for producing an electromagnetic field for horizontally deflecting the electron beam produced by the CRT electron gun. The amplified square wave signal developed at the output of horizontal sweep amplifier 14 is manifested as a corresponding sawtooth current signal in horizontal deflection coil 16, the amplitude and pulse width of the sawtooth current pulses determining the extent to which the electron beam is horizontally deflected across the CRT screen. In the circuit of FIG. 1, a variable horizontal width control inductor 18 is connected in shunt relationship with horizontal deflection coil 16 while, in the circuit of FIG. 2, a variable horizontal width control inductor 20 is connected in series relationship with the horizontal deflection coil.

In the case of the shunt width control technique, variable inductor 18 is characterized by a relatively high impedance relative to horizontal deflection coil 16, and forms a current divider with horizontal deflection coil 16 for selectively reducing the amplitude of the sawtooth current pulses developed in the deflection coil which, in turn, reduces the width of the horizontal presentation on the CRT screen. As the inductance of the variable shunt indicator 18 is reduced less current flows through horizontal deflection coil 16 thereby reducing the extent of horizontal deflection. On the other hand, increasing the inductance of the variable shunt inductor 18 increases the current flowing through horizontal deflection coil 16 increasing the extent of horizontal deflection. In the case of the series horizontal width control technique, variable inductor 20 is characterized by a relatively low impedance relative to horizontal deflection coil 16 and also functions to selectively reduce the level of sawtooth current flowing in horizontal deflection coil 16. In particular, increasing the inductance of variable inductor 20 decreases the level of sawtooth current in horizontal deflection coil 16 for reducing the extent of horizontal deflection while reducing the inductance of inductor 20 increases the sawtooth current in horizontal deflection coil 16 increasing the extent of horizontal deflection.

In both prior art circuits, it will be appreciated that variable inductors 18 and 20 affect the total impedance seen at the output of the horizontal deflection circuits, and that this total impedance would be different depending on the particular setting of the variable inductor. The total impedance seen at the output of the deflection circuit in the circuit of FIG. 1 is inversely related to the setting of variable inductor 18 while, in the circuit of FIG. 2, the total impedance is directly related to the setting of variable inductor 20. Thus, as the inductance of variable inductors 18 and 20 is changed to effect control of the extent of horizontal beam deflection, the horizontal deflection circuits are somewhat detuned since their outputs are connected to different impedance circuits. This detuning effect is highly undesireable, it therefore being a major object of the present invention to provide a horizontal width control circuit not subject thereto.

Figure 3:
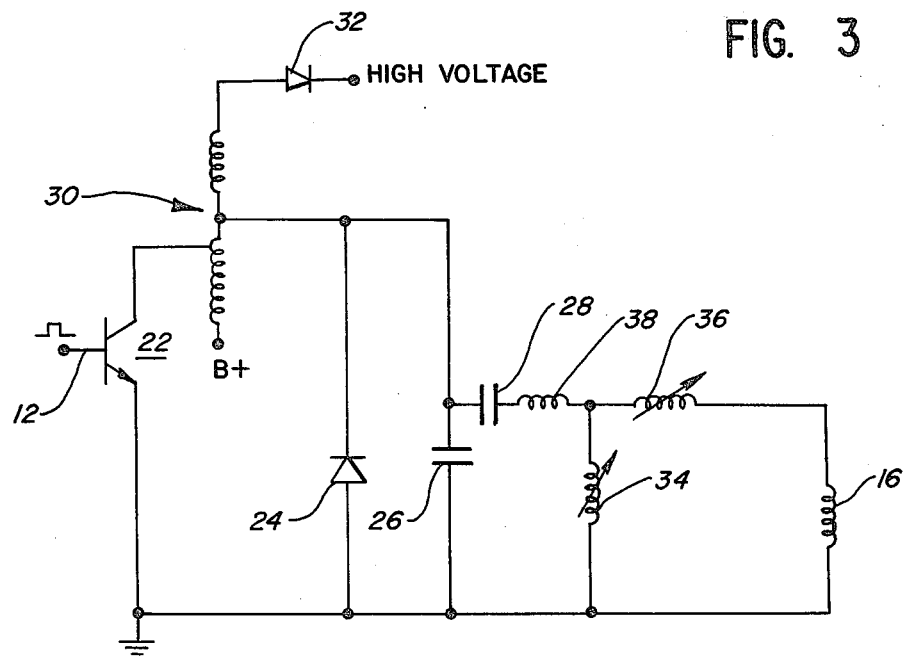
FIG. 3 illustrates a horizontal width control circuit constructed according to the present invention and adapted for use in an image display apparatus including a CRT.

FIG. 3 illustrates one embodiment of the horizontal width control circuit of the present invention. A horizontal output device such as a transistor 22 couples the square wave output of horizontal oscillator 10 through a damping diode 24 and a damping capacitor 26 to one plate of a coupling capacitor 28. The output of transistor 22 is also converted by a flyback transformer 30 and rectified by a diode 32 for generating a high voltage signal for operating the CRT of the image display apparatus. The second plate of coupling capacitor 28 is connected to a variable inductor 34 which is connected in shunt relationship with horizontal deflection coil 16 and to a variable inductor 36 which is connected in series relationship with horizontal deflection coil 16. A linearity coil 38 may also be connected in series relationship with the network consisting of horizontal deflection coil 16 and variable inductors 34 and 36.

It will thus be appreciated that the circuit of FIG. 3 employs a combined series-shunt arrangement for controlling the extent of horizontal deflection. The advantage realized by this combination is that the detuning effect caused by one of the variable inductors can be offset by the operation of the other inductor. In addition, a larger range of impedance variation can be realized because of the tuning stabilization.

When using the circuit of FIG. 3 to adjust the extent of horizontal deflection in an image display apparatus, the inductance of variable inductors 34 and 36 are controlled in opposite directions to maintain the composite impedance of inductors 34, 36, 36 and 16 at a constant value. This allows the horizontal width of the video presentation to be controlled without detuning the horizontal deflection circuit. For example, if it is desired to increase the horizontal width of the video presentation, the inductance of variable inductor 36 is decreased while the inductance of variable inductor 34 is increased. As a result, the sawtooth current in horizontal deflection coil 16 is increased but the composite impedance seen by the horizontal deflection circuits remains substantially constant. Similarly, if it is desired to reduce the horizontal width of the video presentation, the inductance of variable inductor 36 is increased and the inductance of variable inductor 34 is correspondingly decreased to effect an overall decrease in the amplitude of the sawtooth current flowing in horizontal deflection coil 16 while maintaining the composite impedance seen by the horizontal deflection circuit at a substantially constant value. Furthermore, the range of horizontal width control is increased relative to the prior art circuits since two variable inductors are employed, the use of this increased range being facilitated by the tuning compensation effect achieved by operating variable inductors 34 and 36 in opposite directions to maintain a constant level of impedance.

Figure 4:
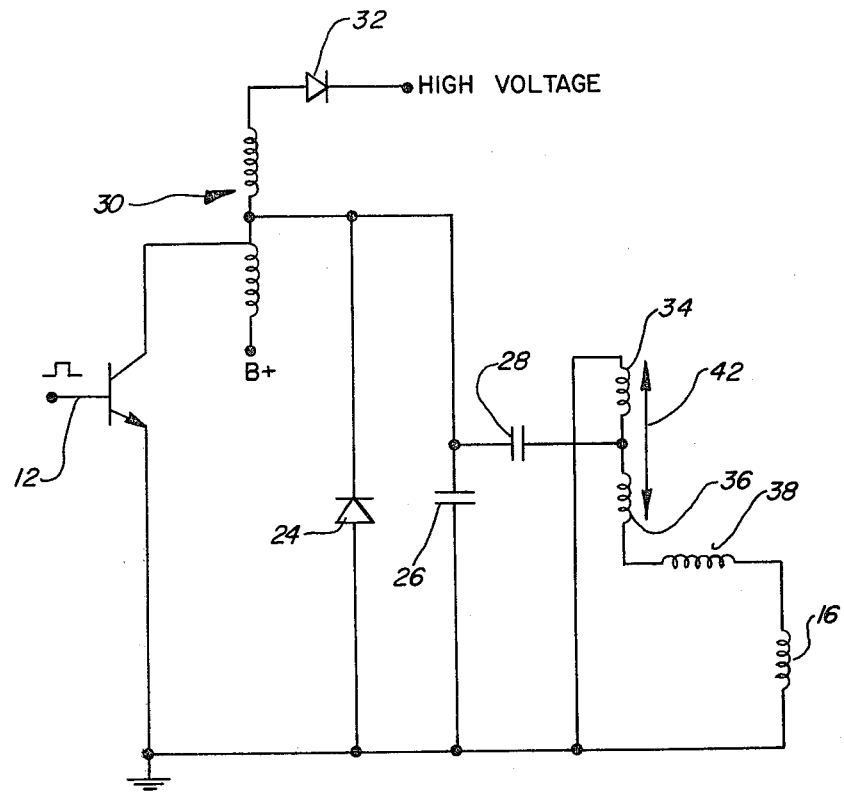
FIG. 4 illustrates another embodiment of the horizontal width control circuit of the invention.
Figure 5:
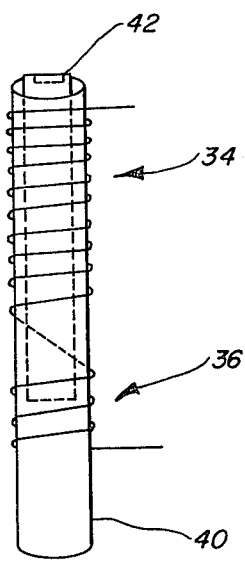
FIG. 5 diagrammatically shows the construction of the series and shunt coils used in the circuit of FIG. 4.

FIG. 4 illustrates an embodiment of the invention which is substantially identical to the circuit of FIG. 3 except that the variable shunt and series inductors 34 and 36 are wound on a common coil form 40 having a single core element 42 as illustrated in FIG. 5. Core element 42, coil form 40 and inductors 34 and 36 are designed such that movement of the core element in one direction increases the inductance of one of the inductors while simultaneously decreasing the inductance of the other inductor. Movement of the core element 42 within coil form 40 in the opposite direction results in the inductors changing inductance in an opposite manner. For example, referring to FIG. 5, assume that it is desired to reduce the horizontal width of the video presentation. As mentioned previously, this is done by increasing the inductance of variable inductor 36 and decreasing the inductance of variable inductor 34. In the circuit of FIG. 4, this effect is conveniently achieved by moving the core element 42 in a downwardly direction within coil form 40 so as to increase the penetration of the core element within coil 36 while reducing the penetration of the core element within coil 34. On the other hand, if it is desired to increase the horizontal width of the video presentation, the core element 42 is moved in an upwardly direction decreasing the inductance of inductor 36 and increasing the inductance of inductor 34. Therefore, by constructing the shunt and variable inductors 34 and 36 as illustrated in FIG. 5 the variation of the inductance of inductors 34 and 36 in the proper directions for controlling the horizontal width of the video presentation and for preventing detuning of the horizontal deflection circuits is insured. Another advantage realized by the construction of variable inductors 34 and 36 as illustrated in FIG. 5 is that the amount of horizontal width change of the video presentation is doubled for a given amount of core element motion as compared to the use of separate cores for each inductor.

Of course, it should be understood that various changes and modifications to the preferred embodiment described herein will be apparent to those skilled in the art. Such changes and modifications can be made without departing from the spirit and scope of the present invention and without diminishing its attendant advantages. It is, therefore, intended that such changes and modifications be covered by the following claims.

We claim:

1. In an image display apparatus of the type having a horizontal deflection coil responsive to a horizontal deflection circuit for horizontally deflecting an electron beam across the screen of a CRT, a horizontal width control circuit comprising:
   a first inductor connected in series relationship with said horizontal deflection coil;
   a second inductor connected in shunt relationship with said horizontal deflection coil; and
   means manually operable for simultaneously varying the impedance of said first and second inductors in opposite directions to maintain the composite inductance thereof substantially constant, whereby to control the extent to which said electron beam is horizontally deflected across said CRT screen without detuning said horizontal deflection circuit.

2. The horizontal width control circuit of claim 1 wherein said first and second inductors are wound in spaced apart relation on a common coil form and wherein said means for varying comprises a single core element longitudinally displaceable within said coil form.

3. In an image display apparatus of the type having a horizontal deflection coil responsive to a horizontal deflection circuit for horizontally deflecting an electron beam across the screen of a CRT, a horizontal width control circuit comprising:
   a coil form;
   a first inductor wound about said coil form and connected in series relationship with said horizontal deflection coil;
   a second inductor wound about said coil form in spaced relation from said first inductor and connected in shunt relationship with said horizontal deflection coil; and
   a core element displaceable within said coil form for simultaneously varying the inductance of said first and second inductors in opposite directions to maintain the composite inductance thereof substantially constant, whereby to control the extent to which said electron beam is horizontally deflected across said CRT screen without detuning said horizontal deflection circuit.

* * * * *